W. H. BAGBY.
NUTCRACKER.
APPLICATION FILED AUG. 26, 1914.
1,146,683.
Patented July 13, 1915.
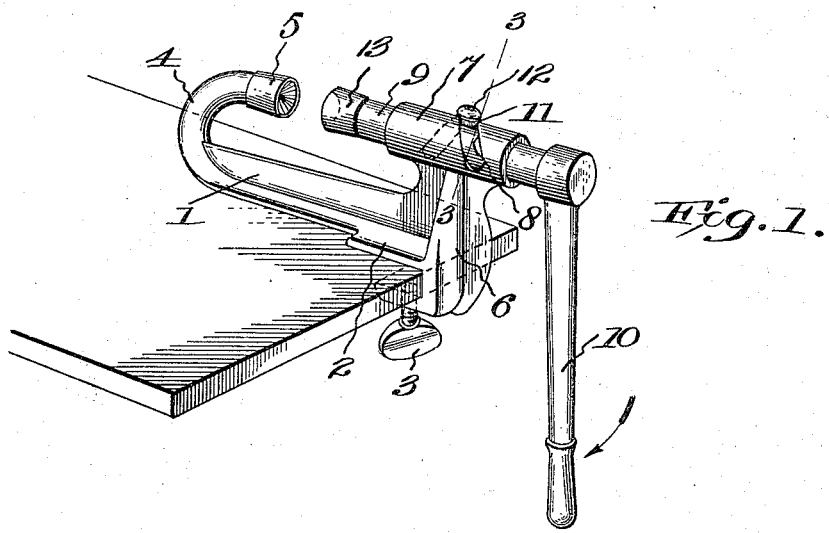
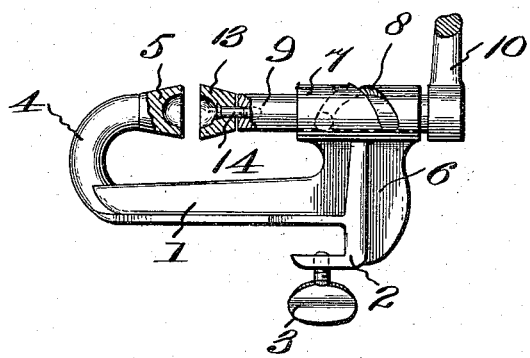
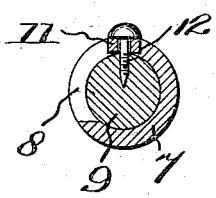
Witnesses
Inventor
William H. Bagby,
by Wilkinson, Giusta & MacKay
Attorneys.

UNITED STATES PATENT OFFICE.

WILLIAM H. BAGBY, OF LOS ANGELES, CALIFORNIA.

NUTCRACKER.

1,146,683.

Specification of Letters Patent. Patented July 13, 1915.

Application filed August 26, 1914. Serial No. 858,685.

*To all whom it may concern:*

Be it known that I, WILLIAM H. BAGBY, a citizen of the United States, residing at Los Angeles, in the county of Los Angeles and State of California, have invented certain new and useful Improvements in Nutcrackers; and I do hereby declare the following to be a full, clear, and exact description of the invention, such as will enable others skilled in the art to which it appertains to make and use the same.

The present invention relates to improvements in nut crackers, and has for an object to provide a nut cracker which will be simple in construction and operation and constituted of a minimum of parts, each of which will be economical of manufacture and readily assembled to form the nut cracker.

It is another object of the present invention to provide an improved nut cracker which will be effective in operation and under control of the operator to apply to the nut any degree of pressure required for effecting the cracking of the shell thereof without destroying the structure of the meat.

A further object of the invention resides in providing an improved nut cracker which will be efficient in operation to the end that large quantities of nuts may be cracked in a minimum of time, whereby to decrease the cost of the operation of the previous methods.

With these and other objects in view the invention consists in the novel details of construction and combinations of parts more fully hereinafter disclosed and particularly pointed out in the claim.

In the accompanying drawings forming a part of this application, and in which similar reference symbols indicate corresponding parts in the several views: Figure 1 is a perspective view of a nut cracker constructed in accordance with the present invention. Fig. 2 is a side elevational view, partly in section, of the same; and Fig. 3 is a cross sectional view taken on the line 3—3 of Fig. 1.

Referring more particularly to the drawings, wherein one embodiment of the invention is illustrated, 1 designates a frame stamped or cast of metal, or produced in any desired manner of other suitable material; and the same is constructed with a clamp 2 operated by a set screw 3 whereby the device may be attached to the edge of a table or other support, as illustrated in Fig. 1. The frame 1 is provided at one end thereof with an upstanding and curved arm 4, to the outer free end of which is secured a fixed jaw 5, extending parallel with the longitudinal center of the frame. The opposite end of the frame is constructed with a post 6 for supporting a bearing sleeve 7, in axial alinement with the fixed jaw 5, and in the bearing sleeve 7 is produced a spiral groove 8. Journaled in the bearing sleeve 7 is a plunger 9 arranged to be rotated by a handle 10 connected to the outer end thereof.

The rotary motion imparted by the handle 10 to the plunger 9 is adapted to be converted to reciprocate the plunger, and to this end the plunger 9 is provided with a roller 11 secured to the same by a screw or other suitable means 12, about which the same freely rotates. The roller 11 travels in the spiral groove 8 formed in the sleeve 7, and coöperates with the groove to reciprocate the plunger when the handle 10 is actuated. To the inner end of the plunger 9 is swivelly connected a movable jaw 13, through a screw 14 threaded into the plunger, and upon which the jaw 13 is free to revolve.

In operation the nut to be cracked is positioned within the fixed jaw 5, and the handle 10 grasped and rotated in the direction of the arrow in Fig. 1, whereupon the movable jaw 13 will advance and grasp the opposite end of the nut, securely holding same between the jaws. Any desired pressure can be brought to bear upon the nut, as required for breaking the shell of the latter, without affecting the meat; and after the operation of cracking, the handle 10 may be released and the same will fall by gravity and cause the movable jaw 13 to retreat and release the nut, which will thereupon fall upon the table or other support or receptacle provided to receive the same.

It will be understood, that, while the plunger 9 receives a rotary motion from the handle 10, the jaw 13, after being brought to position to clamp the nut, will not receive this rotary motion due to the screw 14, which will revolve freely within the jaw 13 and permit the same to exert a direct pressure upon the nut without rotating.

I have illustrated and described preferred and satisfactory constructions, but obviously changes could be made in the herein described apparatus which could be used without departing from the spirit of my invention.

I claim:

In a nut cracker of the character described, the combination of a frame, an arm formed at one end of said frame, a fixed jaw supported on said arm, a post formed at the opposite end of said frame, a cylindrical bearing supported on said post parallel with said frame and coaxial with said fixed jaw, said bearing being provided with a spiral slot formed in the upper longitudinal portion of the same, a plunger mounted for reciprocation and rotation in said cylindrical bearing, means mounted on said plunger and operating in the spiral slot in said bearing for reciprocating the plunger when rotated, a movable jaw swivelly connected to the inner end of said plunger and arranged to coöperate with said fixed jaw to crack the nuts therebetween, and a handle mounted in the outer end of said plunger for rotating the latter and arranged to drop by gravity when released to move the plunger and retreat said movable jaw to automatically free the cracked nut, substantially as described.

In testimony whereof, I affix my signature, in presence of two witnesses.

WILLIAM H. BAGBY.

Witnesses:
OTTIE JONES BAIRD,
HENRY N. RAGATZ.